(12) United States Patent
Guisinger et al.

(10) Patent No.: US 10,384,185 B2
(45) Date of Patent: Aug. 20, 2019

(54) SPRAY DRYING

(71) Applicant: Givaudan, S.A., Vernier (CH)

(72) Inventors: Robert Guisinger, Beavercreek, OH (US); Mary Amanda McKee, Cincinnati, OH (US); Theodore T. Pearl, Harrison, OH (US); James R. Works, Alexandria, KY (US)

(73) Assignee: Givaudan S.A., Vernier (CH)

( * ) Notice: Subject to any disclaimer, the term of this patent is extended or adjusted under 35 U.S.C. 154(b) by 101 days.

(21) Appl. No.: 15/574,561

(22) PCT Filed: May 25, 2016

(86) PCT No.: PCT/EP2016/061800
§ 371 (c)(1),
(2) Date: Nov. 16, 2017

(87) PCT Pub. No.: WO2016/193096
PCT Pub. Date: Dec. 8, 2016

(65) Prior Publication Data
US 2018/0161745 A1  Jun. 14, 2018

Related U.S. Application Data

(60) Provisional application No. 62/168,381, filed on May 29, 2015.

(51) Int. Cl.
B01J 13/04 (2006.01)
B01J 2/04 (2006.01)
B01D 1/18 (2006.01)
B01J 2/00 (2006.01)
B01J 2/02 (2006.01)

(52) U.S. Cl.
CPC .............. B01J 13/043 (2013.01); B01D 1/18 (2013.01); B01J 2/003 (2013.01); B01J 2/006 (2013.01); B01J 2/02 (2013.01); B01J 2/04 (2013.01)

(58) Field of Classification Search
None
See application file for complete search history.

(56) References Cited

U.S. PATENT DOCUMENTS 5,741,478 A  * 4/1998 Osborne ................ B01J 13/043
                                                        424/9.52
9,724,302 B2  8/2017 Schutt et al.
9,730,892 B2  8/2017 Schutt et al.
9,737,482 B2  8/2017 Schutt et al.
(Continued)

OTHER PUBLICATIONS

PCT/EP2016/061800—International Search Report, dated Aug. 17, 2016.

(Continued)

*Primary Examiner* — Mary Lynn F Theisen
(74) *Attorney, Agent, or Firm* — Curatolo Sidoti Co., LPA; Joseph G. Curatolo; Vincent A. Cortese

(57) ABSTRACT

A method of preparing dry core-shell microcapsules from an aqueous dispersion of such capsules, comprising spraying the dispersion through a two-fluid air-liquid nozzle into a heated chamber having an upper part and a lower part, the spraying taking place in the upper part and the lower part being provided with a means of continuous capsule removal. The method allows the drying of capsules with considerably reduced losses.

10 Claims, 1 Drawing Sheet

(56) References Cited

U.S. PATENT DOCUMENTS

| | | | |
|---|---|---|---|
| 9,737,483 | B2 | 8/2017 | Schutt et al. |
| 9,757,336 | B2 | 9/2017 | Schutt et al. |
| 2004/0145069 | A1* | 7/2004 | Low .................. B01J 2/04 261/117 |
| 2009/0012284 | A1* | 1/2009 | Pighi .................. A61K 47/6951 536/103 |
| 2010/0316696 | A1* | 12/2010 | Wiggenhorn ........ A61K 9/1277 424/450 |
| 2011/0200678 | A1* | 8/2011 | Hwang .................. B01J 2/04 424/489 |
| 2011/0250264 | A1 | 10/2011 | Schutt et al. |
| 2013/0177633 | A1 | 7/2013 | Schutt et al. |
| 2013/0177634 | A1 | 7/2013 | Schutt et al. |
| 2013/0177635 | A1 | 7/2013 | Schutt et al. |
| 2013/0177636 | A1 | 7/2013 | Schutt et al. |
| 2013/0177637 | A1 | 7/2013 | Schutt et al. |
| 2013/0177638 | A1 | 7/2013 | Schutt et al. |
| 2013/0183372 | A1 | 7/2013 | Schutt et al. |
| 2013/0183373 | A1 | 7/2013 | Schutt et al. |
| 2013/0183375 | A1 | 7/2013 | Schutt et al. |
| 2013/0195965 | A1 | 8/2013 | Schutt et al. |
| 2013/0306759 | A1 | 11/2013 | Schutt et al. |
| 2014/0079747 | A1 | 3/2014 | Dihora et al. |
| 2014/0086985 | A1 | 3/2014 | Dihora et al. |
| 2015/0086595 | A1 | 3/2015 | Dihora et al. |
| 2015/0328615 | A1 | 11/2015 | Dihora et al. |
| 2016/0206772 | A1* | 7/2016 | Schroder .................. A61L 15/24 |
| 2016/0361260 | A1 | 12/2016 | Schutt et al. |

OTHER PUBLICATIONS

PCT/EP2016/061800—International Written Opinion, dated Aug. 17, 2016.

Mortaza Aghbashlo, et al., "Optimization of Emulsification Procedure for Mutual Maximizing the Encapsulation and Exergy Efficiencies of Fish Oil Microencapsulation", Powder Technology, Mar. 24, 2012, pp. 107-117, vol. 225. Abstract only.

A.M. Borreguero, et al., "Synthesis and Characterization of Microcapsules Containing Rubitherm RT27 Obtained by Spray Drying", Chemical Engineering Journal, Jan. 1, 2011, pp. 384-390, vol. 166, No. 1. Abstract only.

Krzysztof Cal, et al., "Spray Drying Technique. I: Hardware and Process Parameters", Journal of Pharmaceutical Sciences, Sep. 22, 2009, pp. 575-586, vol. 99, Issue 2. Abstract only.

Weidner et al., "High Pressure Micronization for Food Applications", Journal of Supercritical Fluids, Jan. 1, 2009, pp. 556-565, vol. 47, Issue 3. Abstract only.

Estefaniacc, "Spray Drying of an Emulsion Using a Mini-Spray Drier Buchi B-290", URL:https://www.youtube.com/watch?v=sK1UbVveBK8, May 25, 2013, p. 1.

Mortaza Aghbashlo, et al., "Optimization of Emulsification Procedure for Mutual Maximizing the Encapsulation and Exergy Efficiencies of Fish Oil Microencapsulation", Powder Technology, Mar. 24, 2012, pp. 107-117, vol. 225.

A.M. Borreguero, et al., "Synthesis and Characterization of Microcapsules Containing Rubitherm RT27 Obtained By Spray Drying", Chemical Engineering Journal, Jan. 1, 2011, pp. 384-390, vol. 166, No. 1.

\* cited by examiner

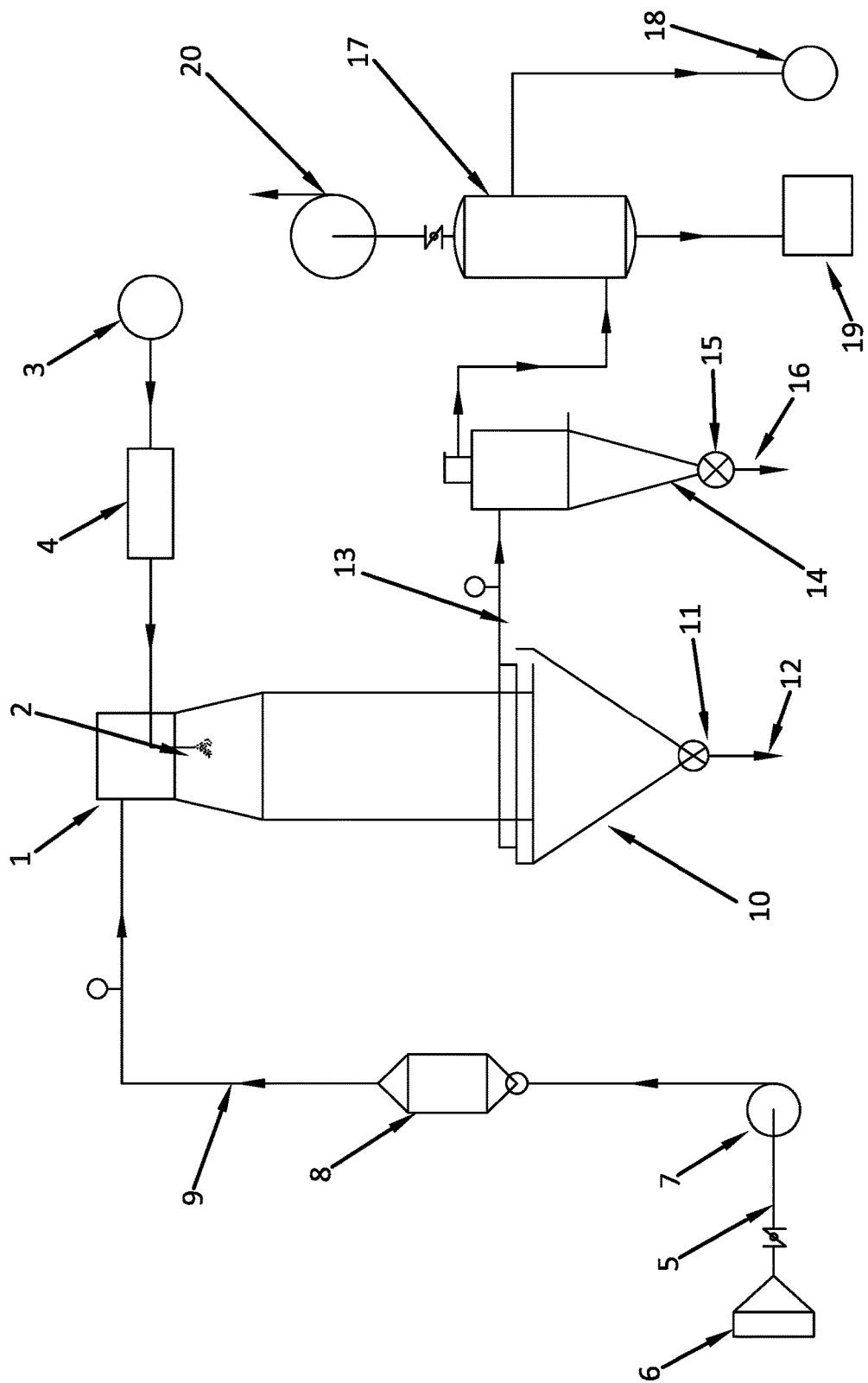

SPRAY DRYING

CROSS REFERENCE TO RELATED APPLICATIONS

This application is a national stage application of International Application No. PCT/EP2016/061800, filed 25 May 2016, which claims priority from U.S. Provisional Patent Application No. 62/168,381, filed 29 May 2015, which applications are incorporated herein by reference.

This disclosure relates to a method of spray drying core-shell microcapsules.

Core-shell microcapsules, that is, microcapsules that comprise a single liquid core surrounded by a continuous polymeric shell, are well known and widely used, and have been used to encapsulate all types of materials, for example, pharmaceuticals, agrochemicals, flavors, fragrances and chemical components requiring separation from other chemical components in the same mixture, such as hardeners for adhesives and crosslinking agents for polymers.

There is a variety of ways of making such core-shell microcapsules, for example, coacervation (the dispersion of the liquid or solid material to be encapsulated in a solution of shell polymer and then causing the polymer to come out of solution and form a shell on the dispersed particles). Another method is to drop individual particles of liquid core material into a gelling bath, in which the shell instantly forms on the particle. The result of all of these processes is an aqueous slurry of core-shell microcapsules.

It is often desired that the microcapsules be recovered from this slurry in dry form. This has been difficult to achieve without massive breakage of capsules. One well-known way of drying is spray drying, in which a liquid is sprayed into a heated chamber. This is also well known as a method of preparing encapsulated substances, by spraying both substance and encapsulating material together into the heated chamber, the result being microparticles containing multiple occlusions of encapsulated substance. However, pre-formed core-shell microcapsules, particularly of larger sizes, are often too fragile to withstand this treatment, and a substantial loss of encapsulated material and a low yield of dried microcapsules is the general result.

It has now been found that it is possible to dry core-shell microcapsules by using a spray drying technique, which does not involve the substantial loss of microcapsules. There is therefore provided a method of preparing dry core-shell microcapsules from an aqueous dispersion of such capsules, comprising spraying the dispersion through a two-fluid air-liquid nozzle into a heated chamber having an upper part and a lower part, the spraying taking place in the upper part and the lower part being provided with a means of continuous capsule removal.

By "two-fluid air-liquid nozzle" is meant a spray nozzle in which the liquid to be sprayed (the dispersion of capsules in this case) enters and leaves the nozzle through a central channel, while air under pressure enters the nozzle through a series of passages placed concentrically around the central channel and meeting the central channel just before it exits into the upper part of the heated chamber. Such nozzles are readily available commercially.

The chamber into which the aqueous dispersion of capsules is sprayed is similar to the chambers used in conventional spray drying equipment. The heat may be provided by heated air entering the chamber through vents located in the upper part of the chamber.

At the lower part of the chamber is located a means of continuously removing dried capsules from the chamber. This constant removal is important, as capsules have then reduced chances of being damaged because of prolonged exposure to elevated temperature. There are a number of readily-available means for doing this. Typical examples include rotary valves, double-flap valves and cycle valves.

In a particular embodiment, the capsules are removed in two stages. This has the advantage of a higher yield of capsules. It also minimizes the explosion hazard inherent in a large body of fine, dry powder.

In a typical arrangement, the means of continuous capsule removal from the heated chamber is the first stage of removal and this is augmented with a second removal stage. This typically takes the form of a conventional cyclone separator equipped with a further means of continuous capsule removal. The various parameters of the components of the system are arranged such that most of the capsules are recovered from the heated chamber into which the dispersion is sprayed, and the remainder is recovered from the second stage. The use of this double recovery system raises the proportion of possible capsule recovery from a typical 80-90% in a single recovery stage to nearly 100%.

The method can be carried out using standard, commercially-available equipment. It is easy, efficient, reliable and safe in use, and delivers a high quality product with a minimum of capsule loss.

BRIEF DESCRIPTION OF THE DRAWING

FIG. 1 depicts a schematic view of a particular embodiment of the present subject matter.

The disclosure is further described with reference to the accompanying drawing, which depicts a particular embodiment and which is not to be considered to be in any way limiting.

A drying chamber generally indicated as 1 is supplied with capsules through a spray head 2 from a feed tank 3 by means of a pump 4. The chamber is supplied with heated drying air through a line 5, the air being drawn through a filter 6 by a fan 7 and then passed on to a heater 8 before entering the drying chamber 1 through a line 9. At the bottom of the drying chamber 1 is an inverted conical section 10 at the bottom of which is a rotary valve 11. This allows the removal of dried capsules continuously through line 12.

Any capsules not recovered through valve 11 are recovered by passing the heated air out of the drying chamber via line 13 to a cyclone separator 14 also equipped with a rotary valve 15. This allows capsules to be removed via line 16.

Potential pollutants are dealt with by means of a scrubber 17 which utilizes water from a tank 18 to clean the air from the cyclone separator. Waste water is collected in a holding tank 19 while cleaned air is exhausted to atmosphere by means of a fan 20.

The invention claimed is:

1. A method of preparing dry core-shell microcapsules from an aqueous dispersion of such capsules, comprising spraying the dispersion through a two-fluid air-liquid nozzle into a heated chamber having an upper part and a lower part, the spraying taking place in the upper part and the lower part being provided with a means of continuous capsule removal.

2. The method according to claim 1, in which the means of continuous capsule removal is selected from rotary valves, double-flap valves and cycle valves.

3. The method according to claim 1, in which the capsules are removed in two stages.

4. The method according to claim 3, in which the means of continuous capsule removal from the heated chamber comprises a first stage of removal.

5. The method according to claim 3, in which a second removal stage comprises a cyclone separator equipped with a further means of continuous capsule removal.

6. A method of preparing dry core-shell microcapsules from an aqueous dispersion of such capsules, comprising spraying the dispersion through a two-fluid air-liquid nozzle into a heated chamber having an upper part and a lower part, the spraying taking place in the upper part and the lower part being provided with a continuous capsule remover.

7. The method according to claim 6, in which the continuous capsule remover is selected from rotary valves, double-flap valves and cycle valves.

8. The method according to claim 6, in which the capsules are removed in two stages.

9. The method according to claim 8, in which the continuous capsule remover from the heated chamber comprises a first stage of removal.

10. The method according to claim 8, in which a second removal stage comprises a cyclone separator equipped with a further continuous capsule remover.

\* \* \* \* \*